March 28, 1939. J. C. BOETTO 2,152,022
BRAKE
Filed March 1, 1935 5 Sheets-Sheet 1

INVENTOR
JEAN CHARLES BOETTO
BY Jerome R. Cox
ATTORNEY

March 28, 1939.  J. C. BOETTO  2,152,022
BRAKE
Filed March 1, 1935    5 Sheets-Sheet 5

INVENTOR
JEAN CHARLES BOETTO
BY Jerome R Cox
ATTORNEY

Patented Mar. 28, 1939

2,152,022

UNITED STATES PATENT OFFICE 2,152,022

BRAKE

Jean Charles Boetto, Croissy, France, assignor to Bendix Products Corporation, South Bend, Ind., a corporation of Indiana Application March 1, 1935, Serial No. 8,869
In France March 6, 1934

10 Claims. (Cl. 188—106)

The present invention relates to a brake mechanism more particularly intended for automotive vehicles circulating on road or on rail.

An object of the invention is to so utilize the stroke of the operating pedal or other control means so as to exert a powerful braking effort regardless of relatively large brake lining wear. Thus there is eliminated most if not all necessity of adjustments of the brake shoes for wear.

Another object of the invention is to provide a brake mechanism in which an initial application of the brake shoes takes place in a hydraulic manner upon initial actuation of the operating pedal and a further application of said brake shoes takes place in a mechanical manner upon a further actuation of said operating pedal.

Another object of the invention is to provide a brake mechanism in which the operating pedal is connected by means of an equalizing bar with a compressor and a mechanical brake hook-up, said compressor being adapted to be set into action upon initial applicaiton of the said pedal, and to be rendered inoperative upon further application of the said pedal operating said brake hook-up.

Other objects and features of the present invention will be apparent to those skilled in the art from the subjoined specification and after consideration of the accompanying drawings in which.

Figure 3:
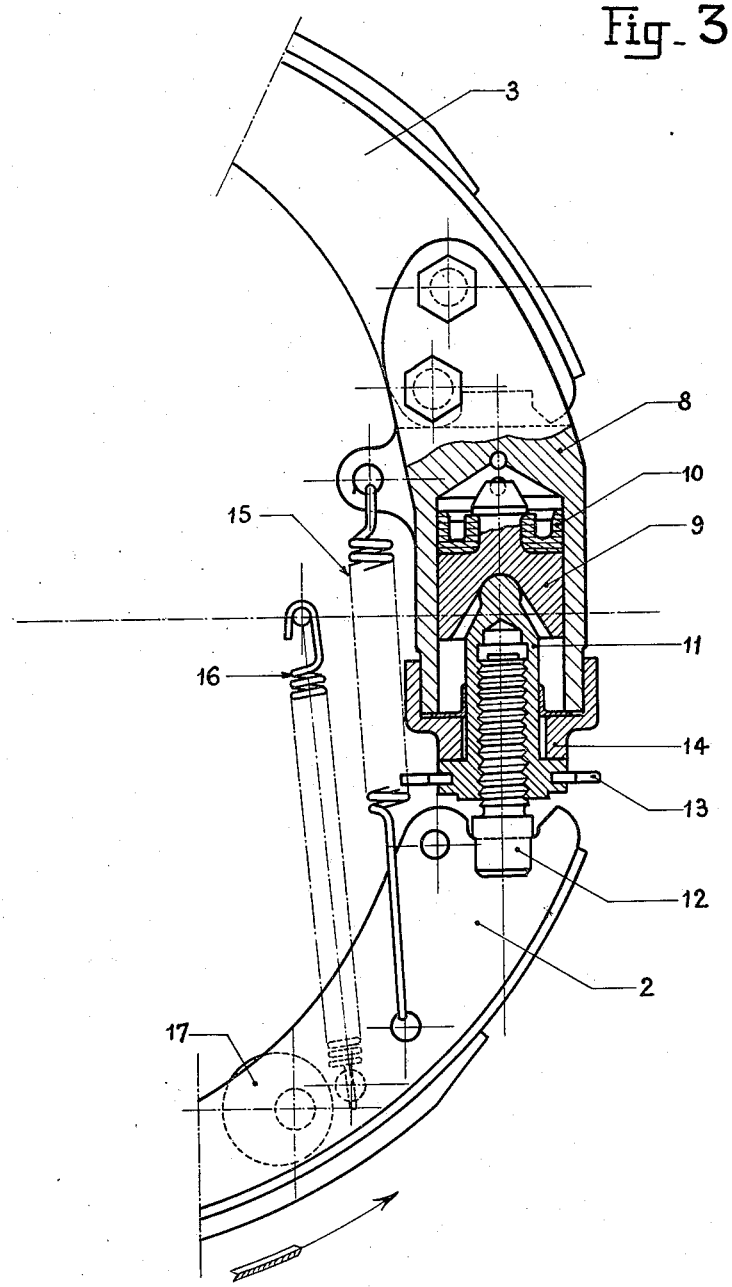
Fig. 3 is a fragmentary sectional view showing the structure of a hydraulic cylinder provided on the brake shoes.

The brake illustrated in the drawings comprises a brake drum 1, a primary brake shoe 2 and a secondary brake shoe 3, which are kept in engagement with the anchor post 5 by means of conventional return springs. The operation of the brake shoes is effected by means of an operating lever 6 pivotally mounted on the secondary brake shoe 3 and connected by means of link 7 to the primary brake shoe 2. The opposite ends of the brake shoes are connected one to the other by means of a device shown in detail on Figure 3 and which comprises a cylinder 8 rigidly secured on the secondary brake shoe 3. A piston 9 is mounted within the cylinder 8 and is provided with a suitable sealing cup 10. This piston 9 is connected with the primary shoe 2 by means of a two-part push member formed by an internally threaded socket 11 taking support against the piston 9 and by a screw 12 provided with a notch by means of which it engages the primary shoe 2.

A wheel 13 provided with suitable notches is integrally made with the socket 11 and enables the rotation of said socket to be effected to adjust the distance beween the brake shoes. The two-part connecting means formed by the socket 11 and the screw 12 takes support against an abutment collar 14. The brake shoes engaged by this connecting means are connected by means of a spring 15, both ends of which are attached to a respective brake shoe. Another spring 16, having one end attached to the primary shoe 2 and another end to the backing plate, urges the two brake shoe assembly and the members connected therewith against an adjustment eccentric 17 to center the brake.

Two conduits 18, 19 connect the cylinders 8 to a T fitting 20a in turn connected to a compressor 20. The operating levers 6 are connected by means of connecting rods 21, 22 with arms 23, 24 carried by a cross shaft 25. The cross shaft 25 is on the one hand connected by means of an arm 26 and rod 27 to a hand lever 28 and, on the other hand, by means of an arm 29 and rod 30 with the equalizing bar 31. Said equalizing bar 31 is, in turn, connected on the one hand by means of a connecting rod 32 with arm 33 connected with the operating pedal 34 and, on the other hand, with the piston rod 35.

Figure 2:
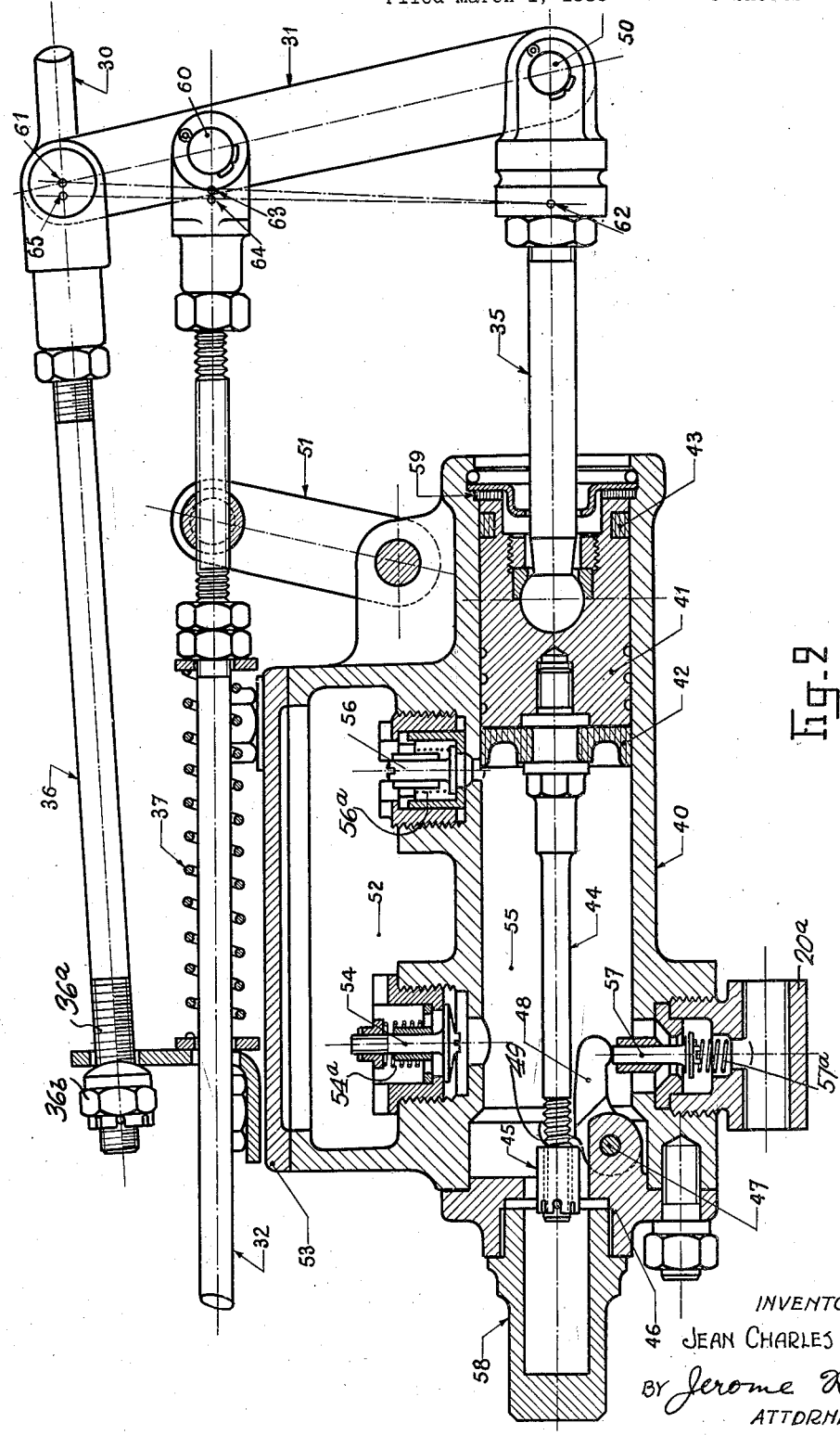
Fig. 2 is a section of the compressor embodied in the brake mechanism shown on Fig. 1.

A link 36 having threads 36a and an adjusting nut 36b enables one to adjust the position of the arm 29 and precludes its movement in a direction opposite to that of the arrow f but enables its displacement in the direction of said arrow. A return spring 37 brings the operating pedal 34 and the piston rod 35 into normal position. The rod 27 is provided with a sliding yoke 38 or the like having a lost motion embodied therein. The compressor 20, shown in section in Figure 2, is formed in a casting 40 having a pressure cylinder 55 in which is adapted to reciprocate a piston 41 provided with sealing cups 42 and 43. The piston 41 carries a stem 44 on which is mounted an adjustment screw 45. The cylinder 55 is closed by a head 46 on which is pivotally mounted, by means of a pin 47, a rocking lever 48. The lever is formed with an upstanding yoke 49 which straddles the rod 44 and against which the nut 45 bears when the piston is in the released position shown in order to cause the lever 48 to push the valve 57 from its seat. It is to be understood, of course, that the valve 57 may be opened by pressure of fluid from the cylinder moving towards the brakes regardless of the position of the lever 48 and that therefore even if the lever 48 has allowed the spring 57a to close the valve 57, fluid under pressure developed by the piston 41 may be forced past the valve 57 to apply the brakes. However, fluid may not flow in the reverse direction back into the cylinder until the piston 41 returns to the released position shown. Thereupon the lever 48 will be moved to open the valve 57 and fluid may then flow back by-passing the valve 57 and through the valve 56 to the reservoir. As the piston 41 is withdrawn toward the released position it sucks fluid in the reservoir 52 through the valve 54, thus insuring compensation. The piston 41 is connected by means of a spheric articulation or the like to the piston rod 35 which is connected by means of a pin 50 with the equalizing bar 31. A link 51 aides in guiding the connecting rod 32 and the equalizing bar 31.

Above the cylinder 55 is provided a reservoir 52 which communicates by suitable passages with the atmosphere and which is closed by a cover 53. The cylinder 55 communicates with the reservoir 52 by means of two valves: one valve 54 enables the passage of fluid from the reservoir 52 into the cylinder 55, and the other valve 56 enables the passage of fluid from the cylinder 55 into the reservoir 52. A third valve 57 allows the passage of fluid from the cylinder 55 into the operating conduits and is controlled positively to enable the passage of fluid from the operating conduits into the cylinder 55 when the rocker arm 48 takes support on the stem of the valve 57.

The valves 54, 56, and 57 are adapted to be applied tightly on their seats, for example, by a suitable working-in and are loaded by springs 54a, 56a and 57a respectively having a suitable force. These springs are relatively light, being strong enough to hold the valves on their seats normally but allowing the valves to open under slight differentials in pressure.

To the head 46 is secured a cylindrical projection 58 adapted to receive the stem 44 projecting from the piston 41. The pressure cylinder, the reservoir and the operating conduits are filled with a liquid from which substantially all gases have been eliminated.

The operation takes place as follows:

The brake shoes 2 and 3 are adjusted with an initial slack sufficient to enable a free rotation of the brake drums 1. Upon depression of the operating pedal 34, the arm 33 operates the connecting rod 32 which acts by means of the pin 60 on the equalizing bar 31. The return springs 4 urging the brake shoes 2 and 3 against the anchor post 5 have a suitable force, so that the elements 21, 22, 23, 24, 25, 29 and 30 remain immovable. The pin 61 remains therefore immovable and operates as a fulcrum for the equalizing bar 31 which, as stated above, is pulled by means of the rod 32. Since the piston rod 35 is connected with the equalizing bar 31 by means of a pin 50, the piston 41 is pushed forwardly in the cylinder 55, forcing the fluid contained therein through the valve 57 into the operating conduits 18, 19 and into the cylinders 8. The brake shoes 2 and 3 are thus spread one from the other, pivoting on the anchor posts 5 until said brake shoes are brought up to the surface of the brake drums 1 to take up the normal slack. The piston 41 is thus arrested in its movement. The fluid is then immovable and has then an equal pressure in the whole system, so that the valve 57 is permitted to be applied against its seat by means of its spring, thus cutting off the cylinder 55 from the conduits 18, 19, the cylinders 8 and pistons 9. In this movement, the equalizing bar 31 rocks about the pin 61 which is immovable and the bar describes an angle which brings the pin 50 to the point 62, the pin 60 being brought to the point 63. As the pin 50 becomes immobilized at the point 62 owing to the immobilization of the piston 41, in its turn it operates as a fulcrum for the equalizing bar 31 which, being always applied by the rod 32, pulls by means of the pin 61 on the rod 30. This traction effort is transmitted by the rod 30 on the arm 29, and by means of the cross shaft 25 and the above connecting members acts on the operating levers 6 which apply the brake shoes 2 and 3 against the brake drums 1. The braking torque will be absorbed by the anchor post 5, one or the other of the shoes contacting with said post and the other shoe transmitting its torque to the anchored shoe through the fluid in the cylinder 8. This fluid, owing to the pressure of the primary shoes, will have a tendency to escape through the conduits 18 and 19 into the cylinder 55 but this escape will be prevented owing to the closure of the valve 57 which is applied against its seat with a force the value of which is increased with the degree of pressure applied on the fluid.

It is apparent from the foregoing that the shifting of the pin 61, which is under the action of the traction exerted on the rod 32 and which may bring it, for instance, to the point 65, will be at all events very small and will be due mainly to the flexion or to the compression of the respective members since the action of the rod 30 will take place during a subsequent stage when the brake shoes 2 and 3 were already applied with a certain force against the brake drums 1 under the action of the fluid expelled during the initial stage by the compressor 20.

It is important that the secondary brake shoe 3 comes into contact with the drum prior to the primary brake shoe 2. This is realized by means of springs 15, 16 and eccentric 17, which act in the following manner:

When, under the effect of the fluid acting between the cylinders 8 and the pistons 9, the brake shoes 2 and 3 are separated one from the other, the brake shoes 2 are kept in contact with the eccentric 17 and away from the drum by means of the springs 16, whilst the brake shoes 3 are applied against the brake drums 1. The brake shoes 2 exert thereafter a pull on the springs 16 and are disengaged from the eccentric 17. The brake shoes 2 are now spaced from the brake shoes 3 tensioning said springs 16, and are applied in their turn against the brake drums 1.

This initial application of the brake shoes will take place in this manner whatever may be the slack between the brake shoes and brake drums, regardless of the slack due to adjustment or to partial or total wear of the brake linings.

The braking operation being ended, the brake pedal 34 is released. The spring 37 acting through the intermediary of connecting rod 32 brings to normal position the operating pedal 34 and the equalizing bar 31. The piston 41 is then brought into contact with the abutment collar 59. Durings this movement, the valve 54 opens under the action of the atmospheric pressure which reigns in the reservoir and enables the fluid contained therein to enter into the cylinder 55 as the piston 41 effects its return stroke until the moment when the screw 45, which is adjusted in a suitable way, engages one arm of the rocking lever 48, the other arm of which is applied on the stem of the valve 57 and disengages the latter from its seat. The fluid previously sent between the cylinders 8 and the pistons 9 is enabled to return to the cylinder 55 under the action of the return springs 15, which brings together the brake shoes 2 and 3. Since the cylinder 55 is filled with fluid coming from the reservoir 52, the fluid returning from the cylinders 8 expels a corresponding quantity of fluid through the valves 56, which will be lifted under the action of a pressure the extent of which will be responsive to the force of the return spring embodied in said valve 56. The latter will close again when this pressure decreases, although remaining substantially higher than the atmospheric pressure.

The device is then brought back to its initial position and ready for a new braking operation which will take place in the above mentioned manner.

The size of the piston 41 and the stroke thereof can be determined in such a manner that, whatever slack there may be between the brake shoes and the drums, the fluid forced by the compressor 20 into the cylinders 8 assures for the initial travel of the operating pedal 34 a contact between the brake shoes 2 and 3 and the brake drums 1. This result will be attained by a suitable choice of the size of the piston 41, of the position of the pin 60 on the equalizing bar 31, and of the leverages of the arm 33 and of the operating pedal 34. The arrangement will be such as to obtain on the operating levers 6 a powerful braking by a suitable pressure exerted on the operating pedal 34.

Owing to the presence of a single piping in the above mentioned device, and owing to the intercommunication afforded between the cylinders 8, it will be apparent that the pressure of application of the brake shoes 2 and 3 against the brake drums 1 will be identical, so that an equal braking effect will be realized.

In the device described above, the mechanical operating means are always brought to their initial position since, owing to the initial application of the brake shoes 2 and 3 against the brake drums 1, the latter take support against the anchor posts 5. The effort applied on the operating pedal is transmitted to the pressure responsive members with a suitable transmission ratio, and permits realization of complementary powerful pressure of said brake shoes against their brake drums without any fatigue and without any important displacement of the operating pedal taking place. It will thus be possible, for a normal stroke of the operating pedal, to take up the slack due to wear without any need of adjustment, and this for an important part of the thickness of the linings and even until their total wear.

The above description relates to the braking effected by means of the operating pedal. The braking by means of the hand lever takes place as follows:

By pulling the lever 28 in the direction of the arrow g, the arm 26 is operated through the connecting rod 27 so that the cross shaft 25, the arms 23 and 24, the connecting rods 21 and 22, actuate the operating levers 6, the result being that the brake shoes 2 and 3 are spread apart in the drums 1 to effect the braking action. During this operation, for the direction of rotation indicated by the arrow (Figure 3) the brake shoes 2, by means of the two-part connection 11, 12, push the brake shoes 3 against the anchor posts 5. The operation will be opposite for an opposite direction of rotation.

The adjustment of the brake shoes for the hand lever braking operation may take place at any suitable moment owing to the two-part connection 11—12, the elongation of which can be produced by the rotation of the notched wheel 13, so as to bring the slack between the brake shoes and the drums to a suitable value. The wheel 13 will be maintained in adjusted position by means of the spring 15 which engages in a suitable notch provided on said wheel 13.

Suitable sliding yokes 38 and 39, with a lost motion embodied therein, are provided so that the normal position of the brake pedal 34 and of the arm 26 is not affected by the operation of one or the other of these means.

If necessary, a suitable abutment can be provided to limit the rocking of the equalizing bar 31, in case of breakage.

Figure 1:
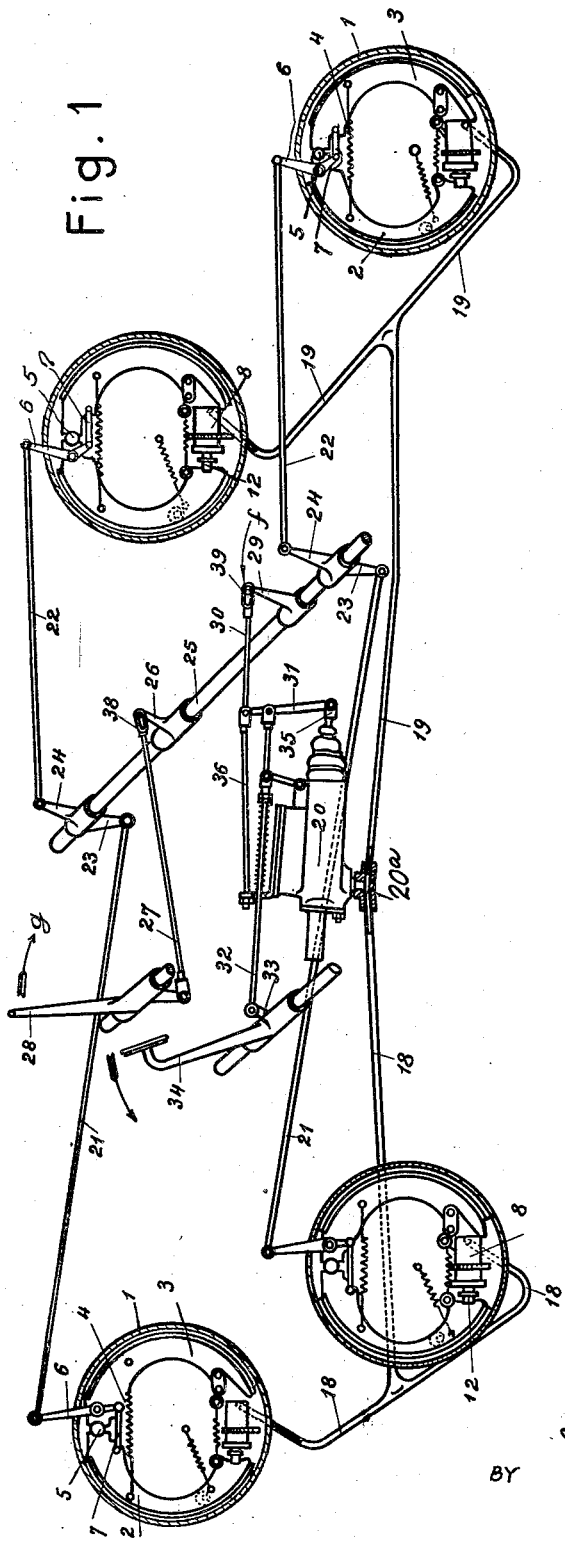
Fig. 1 is a diagrammatic view of one embodiment of the invention applied to a vehicle brake system having brakes of the self energising type.
Figure 4:
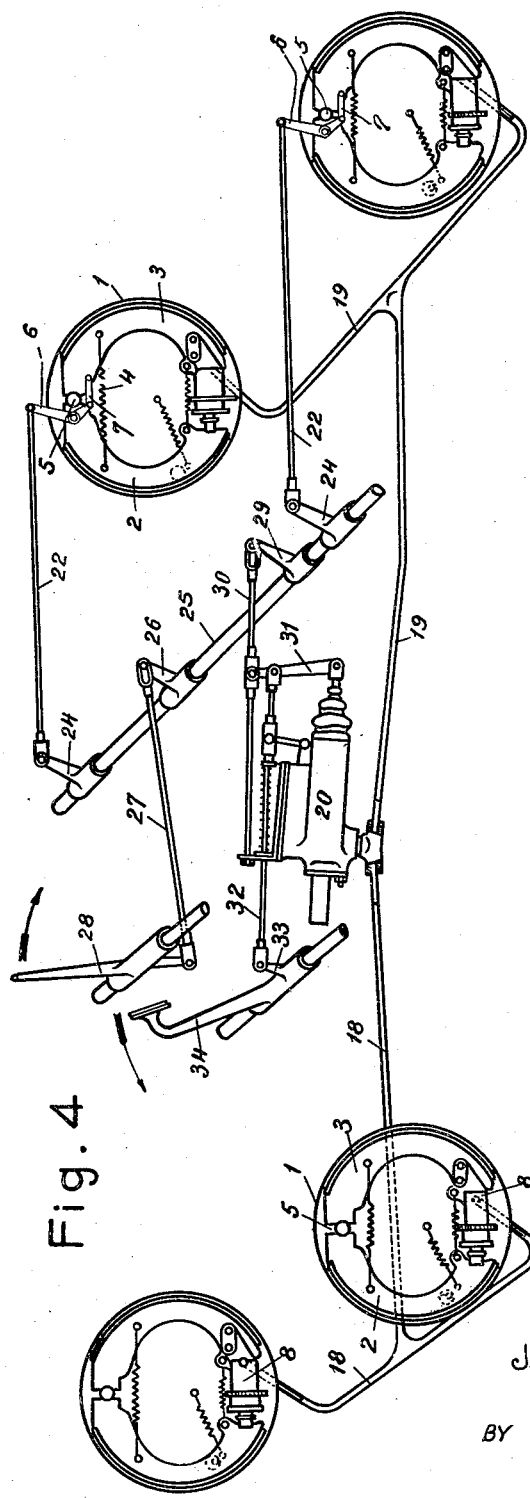
Fig. 4 is similar to Fig. 1 and shows another embodiment of the invention.

The device shown in Fig. 4 is an alternative embodiment of the device shown in Fig. 1. The brake hook-up formed by the arm 23, the connection rods 21, the operating levers 6 and the links 7 has been omitted for the front brakes.

The remaining device is similar to that shown in Fig. 1 and the operation is effected in the same manner as that of the rear part. The front braking is realized, during an initial stage, by forcing fluid between the pistons 9 and the cylinders 8 in the manner described above, and in a subsequent stage by a reaction of the primary shoes 2 which act, by means of the two-part connection 11—12 on the pistons 9 and bring the fluid to a substantial pressure equal in all points of the hydraulic circuit. The front brakes operate then as brakes having brake shoes pivoting about the anchor posts 5 and are actuated in a hydraulic manner.

Figure 5:
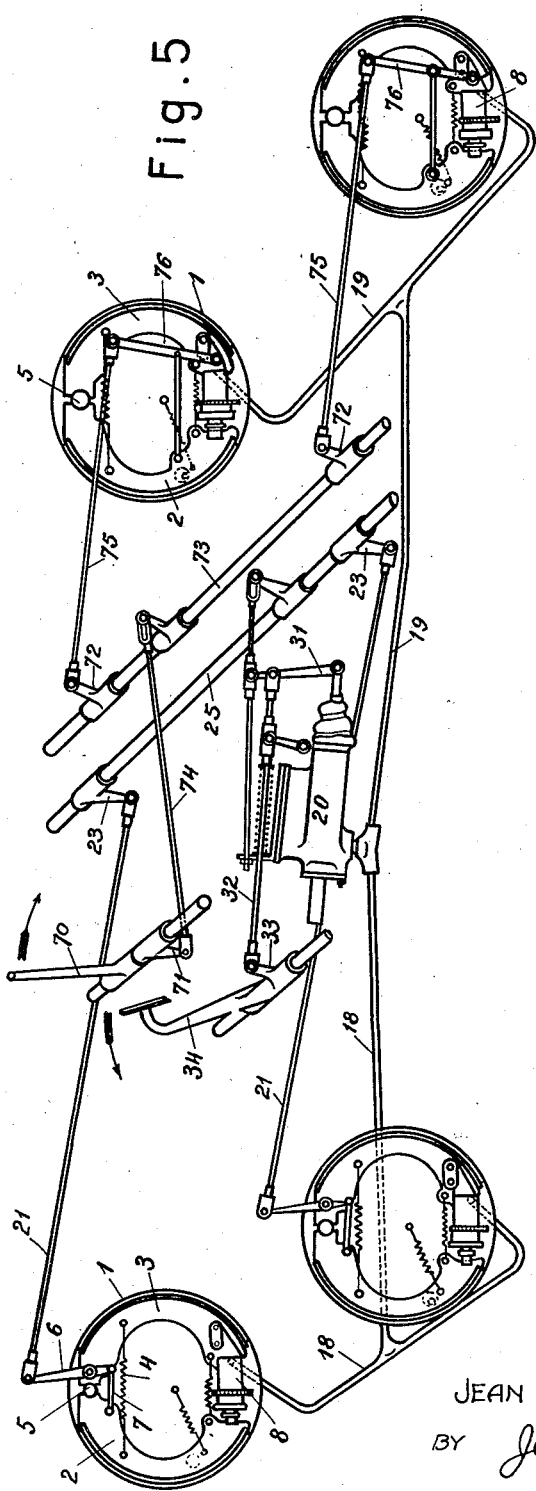
Fig. 5 is similar to Fig. 1 and shows a third embodiment of the invention.

The device shown in Figure 5 is similar to that shown in Fig. 4. The difference consists in that it comprises connecting members and operating means for the rear brakes which are independent from the brake operating members engaged with the operating pedal. It is apparent that the hand lever 70 may act by means of the operating members formed by the arms 71, 72, shaft 73, connecting rods 74 and 75, on the levers 76 which effect the spreading of the brake shoes 2 and 3. These brakes act as brakes having brake shoes pivoted about the anchor posts 5 and controlled in hydraulic manner similar to that described in connection with the brake shown in Fig. 4.

The invention can be realized in numerous suitable embodiments, for instance for vehicles circulating on road or on rails, and it is expressly understood that the embodiments shown in the drawings are given as an example only, and that various changes may be made therein without departing from the spirit and scope of the invention.

What I claim is:

1. In a mechanism of the class described the combination of friction means, a control means therefor, fluid operating means including a master cylinder device operated by the control means and means connected to the master cylinder device and adapted to exert an initial applying force acting on said friction means, means operated to disconnect the master cylinder device from the means connected thereto to render the master cylinder device inoperable upon increase of said applying force, and mechanical operating means adapted to be set into action upon disconnection of said master cylinder device.

2. In a mechanism of the class described the combination of brake shoes, control means therefor, hydraulic operating means operatively connected with the said brake shoes, mechanical operating means operatively connected with said brake shoes, an equalizing bar engaged with both said hydraulic operating means and mechanical operating means, and operatively connected with the said control means.

3. In a mechanism of the class described the combination of a drum, brake shoes, a control means therefor, operating means operatively connected to apply the brake shoes with initial force on the drum, and adapted to be rendered inoperative upon increase of said force, another operating means operatively connected with said brake shoes to apply the latter with increased force on the said drum, an equalizing bar engaged with both said operating means and connected with the said control means.

4. In a mechanism of the class described the combination of a drum, primary brake shoe, secondary brake shoe, anchor post against which the two-shoes assembly takes support according to the rotational direction of the drum, a connection between said brake shoes at the ends opposite the anchor post including hydraulically operated means, a compressor operatively connected to said hydraulically operated means and adapted to operate the latter upon initial application of the brake and to be cut off from the latter upon further application of the brake, and means for applying additional operating pressure to the shoes adjacent the anchor post when said means is so cut off.

5. In a mechanism of the class described the combination of drums, anchorage means for said shoes, brake shoes adapted to be applied on said drums, a control means therefor, a hydraulic cylinder operatively mounted between two brake shoe ends and forming a floating extensible connection between said shoes at the side of the drum diametrically opposite to said anchoring means and adapted to apply initial pressure on said brake shoes, mechanical operating means mounted between the two opposite brake shoe ends and adapted to apply an increase pressure on said brake shoe ends upon actuation of said control means.

6. In a mechanism of the class described the combination of front wheel assemblies, rear brake wheel assemblies, control means therefor, fluid actuated means operatively connected with the front and rear wheel brake assemblies, mechanical means operatively connected with one set of wheel brake assemblies, an equalizing bar engaged with said fluid actuated means and mechanical means and arranged to permit an initial operation of the said fluid actuated means and a further operation by the said mechanical means.

7. In a mechanism of the class described the combination of front wheel brake assemblies, rear wheel brake assemblies, fluid operating means acting on the front and rear wheel brake assemblies adapted to exert an initial braking action and to be rendered ineffective to apply increased pressure to said assemblies upon increase of said braking action, mechanical operating means on one set of wheel brake assemblies adapted to exert the increased braking action, an equalizing bar adapted to pivot about one end to set into action said fluid operating means, and to pivot about its other end upon said fluid operating means being rendered ineffective to set into action said mechanical operating means.

8. In mechanism of the class described, the combination of brake shoes, control means therefor, an equalizing bar connected with said control means, mechanical brake hook-up means operatively connected with one end of said equalizing bar, about which the latter pivots during the initial stage of the application of the brake, and hydraulic operating means operatively connected with the other end of said equalizing bar, about which the latter pivots during a subsequent stage of the application of the brake.

9. A fluid operated braking system comprising brakes each including shoes provided with anchorage means at one side of the brake and a floating connection at the other side of the brake, and two cooperatively-acting applying means, one of which acts on said connection to give an initial braking action and the other of which acts on the shoes independently of said connection to give a further braking action with one shoe anchored and the torque of the unanchored shoe transmitted through said connection to the anchored shoe.

10. A fluid operated braking system comprising brakes each including shoes provided with anchorage means at one side of the brake and with a floating expansible fluid device forming a connection between the shoes at the other side of the brake, and two cooperatively-acting applying means, one of which acts by fluid power on said connection to expand said device to give an initial braking action and the other of which acts on the shoes independently of said connection to give a further braking action with one shoe anchored and the torque of the unanchored shoe transmitted through the fluid in said device to the anchored shoe.

J. C. BOETTO.

CERTIFICATE OF CORRECTION.

Patent No. 2,152,022. March 28, 1939.

JEAN CHARLES BOETTO.

It is hereby certified that error appears in the printed specification of the above numbered patent requiring correction as follows: Page 1, first column, line 22, for "applicaiton" read application; page 2, second column, line 73, for "Durings" read During; page 3, first column, line 14, for "valves" read valve; page 4, first column, lines 39 and 40, claim 5, strike out the words and comma "anchorage means for said shoes," and insert the same after "drums," in line 41, same claim; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.